(12) United States Patent
Ng et al.

(10) Patent No.: US 10,389,257 B2
(45) Date of Patent: Aug. 20, 2019

(54) SWITCH EFFICIENCY OPTIMIZATION CIRCUIT

(71) Applicant: SKYWORKS SOLUTIONS, INC., Woburn, MA (US)

(72) Inventors: Wendy Ng, Los Gatos, CA (US); James Jason Locascio, Mountain View, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

(21) Appl. No.: 15/791,349

(22) Filed: Oct. 23, 2017

(65) Prior Publication Data

US 2018/0115250 A1    Apr. 26, 2018

Related U.S. Application Data

(60) Provisional application No. 62/411,390, filed on Oct. 21, 2016.

(51) Int. Cl.
| H02M 3/335 | (2006.01) |
| H02M 1/088 | (2006.01) |
| H02M 3/156 | (2006.01) |
| H02M 1/38  | (2007.01) |
| H02M 3/158 | (2006.01) |

(52) U.S. Cl.
CPC ....... *H02M 3/33546* (2013.01); *H02M 1/088* (2013.01); *H02M 1/38* (2013.01); *H02M 3/156* (2013.01); *H02M 3/1588* (2013.01); *H02M 3/33584* (2013.01); *Y02B 70/1466* (2013.01)

(58) Field of Classification Search
CPC .......... H02M 3/02; H02M 3/10; H02M 3/145; H02M 3/155; H02M 2003/1552; H02M 3/156; H02M 3/158; H02M 1/08; H02M 1/088; H02M 1/38
See application file for complete search history.

(56) References Cited

U.S. PATENT DOCUMENTS

| 5,929,577 | A  | * | 7/1999  | Neidorff ................. H02P 6/182 318/400.24 |
| 6,424,129 | B1 | * | 7/2002  | Lethellier ........... H02M 3/1584 323/272 |
| 7,170,340 | B1 | * | 1/2007  | Bhatt ...................... H03F 3/217 330/10 |
| 7,463,089 | B1 | * | 12/2008 | Bapat ...................... H03F 3/217 330/10 |
| 9,748,774 | B2 | * | 8/2017  | Van Den Brink ...... H02J 5/005 |
| 9,837,887 | B1 | * | 12/2017 | Zhou ....................... H02P 27/08 |
| 2005/0253567 | A1 | * | 11/2005 | Tai ....................... H02M 3/1584 323/282 |

(Continued)

*Primary Examiner* — Adolf D Berhane
(74) *Attorney, Agent, or Firm* — Chang & Hale LLP

(57) ABSTRACT

A voltage converter is disclosed to include a high-side switch circuit block comprising a plurality of high-side switching elements and a low-side switch circuit block comprising a plurality of low-side switching elements. The voltage converter may include an intermediate node coupled to one or more high-side switching elements and coupled to one or more low-side switching elements. The voltage converter may further include a segmentation circuit block communicatively coupled to the high-side switch circuit block and communicatively coupled to the low-side switch circuit block.

16 Claims, 16 Drawing Sheets

(56) References Cited

U.S. PATENT DOCUMENTS

| | | | | |
|---|---|---|---|---|
| 2007/0188219 | A1* | 8/2007 | Segarra | G01R 19/32 330/2 |
| 2014/0003107 | A1* | 1/2014 | Lee | H03K 17/6871 363/131 |
| 2014/0204972 | A1* | 7/2014 | Mehringer | G01R 31/343 374/45 |
| 2015/0331049 | A1* | 11/2015 | Luo | G06F 1/26 324/416 |
| 2016/0043624 | A1* | 2/2016 | Jarvinen | H02M 1/084 323/271 |
| 2016/0111957 | A1* | 4/2016 | Mathew | H02M 3/1584 323/271 |
| 2017/0019015 | A1* | 1/2017 | Wibben | H02M 1/36 |
| 2017/0229967 | A1* | 8/2017 | Li | H02M 3/1584 |
| 2017/0248996 | A1* | 8/2017 | Zhang | G06F 1/26 |
| 2018/0154787 | A1* | 6/2018 | Chen | H02M 3/158 |

* cited by examiner

SWITCH EFFICIENCY OPTIMIZATION CIRCUIT

CROSS-REFERENCE TO RELATED APPLICATION(S)

This application claims priority to U.S. Provisional Application No. 62/411,390 filed Oct. 21, 2016, entitled SWITCH EFFICIENCY OPTIMIZATION CIRCUIT, the disclosure of which is expressly incorporated by reference herein in its entirety.

BACKGROUND

Field

The present disclosure generally relates to voltage converters.

Description of the Related Art

Electronics and communications devices are increasingly being required to support radio-frequency applications having a larger range of power requirements. A voltage converter configured only to support the highest end of the range of power requirements may be inefficient at providing low and intermediate output voltage levels. A need exists to adequately meet the highest output voltage requirements, while efficiently providing lower output voltages to extend battery life of electronic devices.

SUMMARY

In accordance with some implementations, the present disclosure relates to a voltage converter comprising a high-side switch circuit block comprising a plurality of high-side switching elements and a low-side switch circuit block comprising a plurality of low-side switching elements. The voltage converter may also comprise an intermediate node coupled to one or more high-side switching elements and coupled to one or more low-side switching elements and a segmentation circuit block communicatively coupled to the high-side switch circuit block and communicatively coupled to the low-side switch circuit block. In some embodiments, one or more inductive elements are coupled to the intermediate node.

In some embodiments, each of the plurality of high-side switching elements of the high-side switch circuit block is a transistor. In some embodiments, the segmentation circuit block is communicatively coupled to a respective gate of each respective transistor of the high-side switch circuit block.

In some embodiments, each transistor of the high-side switch circuit block is a MOSFET. In some embodiments, each respective transistor of the high-side switch circuit block is a PMOS MOSFET having a respective drain terminal coupled to the intermediate node.

In some embodiments, each of the plurality of low-side switching elements of the low-side switch circuit block is a transistor. In some embodiments, the segmentation circuit block is communicatively coupled to a respective gate of each respective transistor of the low-side switch circuit block.

In some embodiments, each transistor of the low-side switch circuit block is a MOSFET. In some embodiments, each respective transistor of the low-side switch circuit block is an NMOS MOSFET having a respective drain terminal coupled to the intermediate node.

In some embodiments, the voltage converter further comprises a current sense circuit block coupled to the intermediate node and a pulse-width modulation source configured to generate a pulse-width modulated signal coupled to the current sense circuit block and coupled to an error correction circuit.

In some embodiments, the pulse-width modulation source is coupled to the high-side switch circuit block and coupled to the low-side switch circuit block. In some embodiments, the pulse-width modulation source is coupled to the segmentation circuit block.

In some embodiments, the segmentation circuit block includes a low-side segmentation block configured to drive the one or more switching elements of the low-side switch circuitry and a high-side segmentation block configured to drive the one or more switching elements of the high-side switch circuitry.

In some embodiments, the segmentation circuit block is configured to receive a control signal indicative of an output state of the voltage converter and selectively drive one or more of the high-side switching elements and one or more of the low-side switching elements based on the control signal.

In some embodiments, an output state is based on an output voltage of the voltage converter. In some embodiments, an output state is based on an output current of the voltage converter.

In some embodiments, the voltage converter further comprises a plurality of high-side switch drivers, each respective high-side switch driver coupled to a respective gate of a respective high-side switching element and a plurality of low-side switch drivers, each respective low-side switch driver coupled to a respective gate of a respective low-side switching element.

In some embodiments, each high-side switch driver is coupled to the high-side segmentation block and each low-side switch driver is coupled to the low-side segmentation block. In some embodiments, each high-side switch driver is coupled to the high-side segmentation block and a pulse-width modulation source, and each low-side switch driver is coupled to the low-side segmentation block and the pulse-width modulation source.

In some embodiments, the high-side switch circuit block comprises a first number of high-side switching elements, and the low-side switch circuit block comprises a second, distinct number of low-side switching elements.

In some embodiments, each of the high-side switching elements are arranged in parallel between an output voltage node and the intermediate node, and each of the low-side switching elements are arranged in parallel between the intermediate node and a ground potential.

In some embodiments, the voltage converter further comprises a plurality of switch-pair branches, each respective switch-pair branch including a high-side switch element, a low-side switch element, a branch-intermediate node and a branch-output node, the high-side switch element coupled to the branch-output node and the branch-intermediate node, and the low-side switch element coupled to the branch-intermediate node and a ground potential.

In some embodiments, a first switch-pair branch has a first branch-intermediate node coupled to the intermediate node, and a first branch-output node coupled to an output voltage node of the voltage converter.

In some embodiments, a respective switch-pair branch has a corresponding branch-output node and a corresponding branch-intermediate node, and is configured to be electrically connected to the first switch-pair branch with an electrical bond between the corresponding branch-output node and the first branch-output node, and an electrical bond between the corresponding branch-intermediate node and the first branch-intermediate node.

In some embodiments, the voltage converter further comprises a plurality of branch-intermediate ports, each respective branch-intermediate port electrically coupled to a respective branch-intermediate node and configured to allow electrical bonding to another branch-intermediate port and a plurality of branch-output ports, each respective branch-output port electrically coupled to a respective branch-output node and configured to allow electrical bonding to another branch-output port.

In some embodiments, each of the high-side switching elements has a first current-handling capacity, and each of the low-side switching elements has a second current-handling capacity. In some embodiments, each of the high-side switching elements has a respective current-handling capacity distinct from the current-handling capacity of another high-side switching element, and each of the low-side switching elements has a respective current-handling capacity distinct from the current-handling capacity of another low-side switching element.

In some embodiments, the voltage converter further comprises an input voltage source coupled to an inductor, the inductor further coupled to the intermediate node and an output voltage node coupled to a capacitor, the capacitor further coupled to a ground potential.

In some embodiments, the voltage converter is a boost converter. In some embodiments, the voltage converter is a switched-mode-power-supply.

In some implementations, the present disclosure relates to a method of implementing a voltage converter, the method including providing a high-side switch circuit block, providing a low-side switch circuit block, providing a segmentation circuit block and providing one or more inductive elements.

In some implementations, the present disclosure relates to a radio-frequency module comprising a packaging substrate configured to receive a plurality of components and a voltage converter implemented on the packaging substrate, the voltage converter including a high-side switch circuit block comprising a plurality of high-side switching elements, a low-side switch circuit block comprising a plurality of low-side switching elements, an intermediate node coupled to one or more high-side switching elements and coupled to one or more low-side switching elements and a segmentation circuit block communicatively coupled to the high-side switch circuit block and communicatively coupled to the low-side switch circuit block. In some embodiments, the RF module is a front-end module (FEM). In some embodiments, one or more inductive elements are coupled to the intermediate node.

In some implementations, the present disclosure relates to a wireless device comprising a transceiver configured to generate a radio-frequency (RF) signal. The wireless device may also comprise a front-end module (FEM) in communication with the transceiver, the FEM including a packaging substrate configured to receive a plurality of components, the FEM further including a voltage converter implemented on the packaging substrate, the voltage converter including a high-side switch circuit block comprising a plurality of high-side switching elements, a low-side switch circuit block comprising a plurality of low-side switching elements, an intermediate node coupled to one or more high-side switching elements and coupled to one or more low-side switching elements and a segmentation circuit block communicatively coupled to the high-side switch circuit block and communicatively coupled to the low-side switch circuit block. The wireless device may further comprise an antenna in communication with the FEM, the antenna configured to transmit the amplified RF signal.

The present disclosure generally relates to the field of electronics, and more particularly, to voltage converters utilizing radio-frequency switches.

DETAILED DESCRIPTION OF SOME EMBODIMENTS

The headings provided herein, if any, are for convenience only and do not necessarily affect the scope or meaning.

Figure 1:
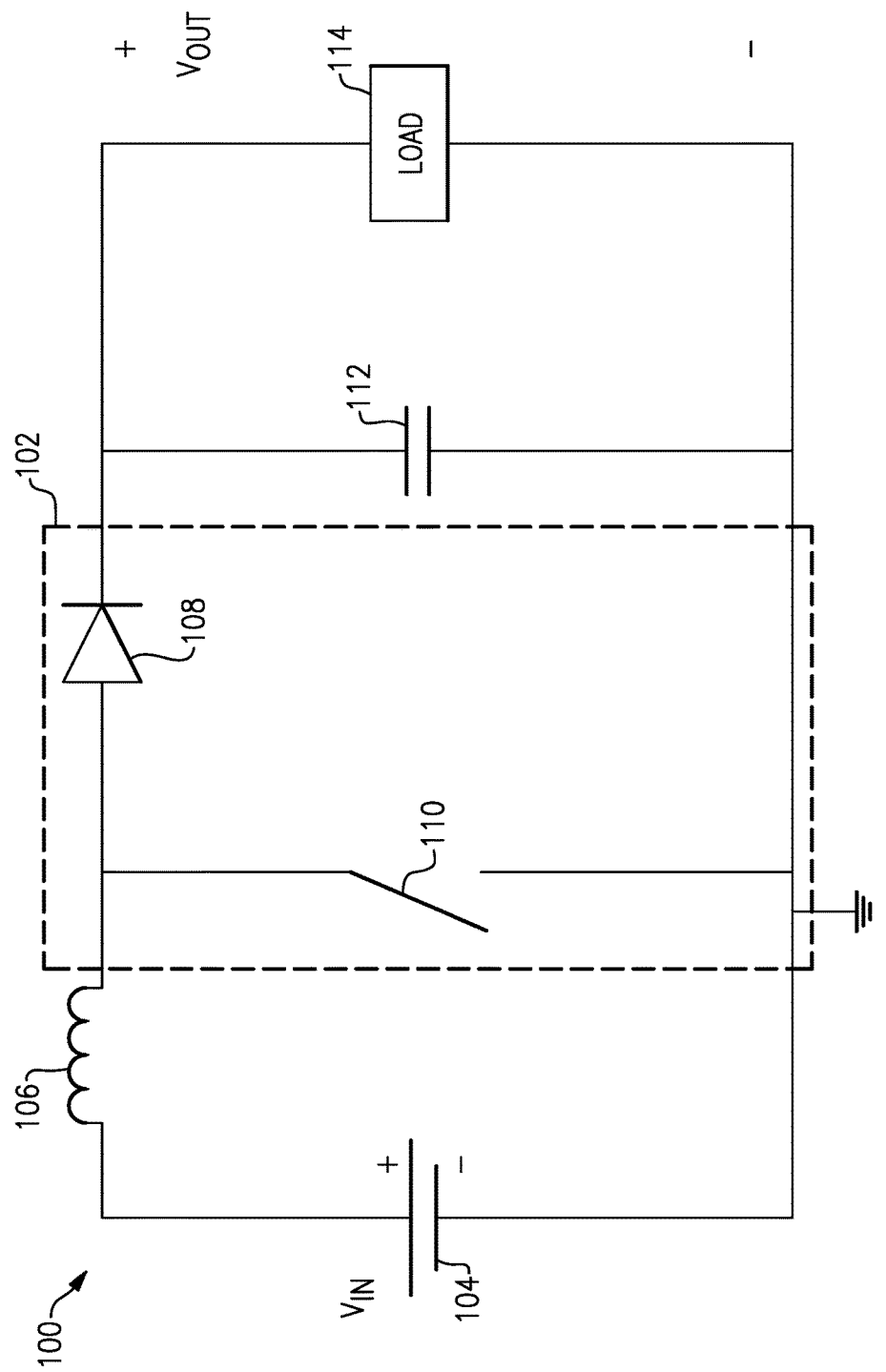
FIG. 1 shows a block diagram representation of a voltage converter in accordance with some embodiments.

FIG. 1 illustrates an example of a voltage converter 100, specifically a basic implementation of a boost converter. In various electronics applications, there is a need to amplify or boost an input voltage 104 to a higher output voltage for a load 114. In some implementations a load 114 is external to the boost converter circuit 100, such as an array of LED's. In some implementations, a voltage converter such as boost converter 100 is coupled to, or is a part of a power amplification system. In some embodiments, such an amplification system can be implemented as one or more devices, and such device(s) can be utilized in a wireless system/architecture. In some embodiments, the wireless system/architecture can be implemented in, for example, a portable wireless device. Examples of such a wireless device are described herein.

The boost converter 100 of FIG. 1 illustrates the additional implementation of an inductor 106, a switch 110, a diode 108 and a capacitor 112 in this simple converter. Switching circuitry 102 includes switch 110 and diode 108. Typically, a boost converter 100 has an inductor-charging stage where switch 110 is closed, so that the inductor current increases and inductor 106 stores some energy. When switch 110 is opened, the inductor current is reduced and inductor 106 acts as a voltage source in series with input voltage 104. Current flows through diode 108 and energy is accumulated in capacitor 112. Diode 108 prevents capacitor 112 from discharging through switch 110 when it is closed.

More specifically, the inductor 106 resists changes in current by creating and destroying a magnetic field. When switch 110 is open, current flows through the inductor 106 in clockwise direction from the input voltage 104 and the inductor 106 stores some energy by generating a magnetic field. Polarity of the left side of the inductor is positive. When switch 110 is opened, current will be reduced as the impedance is higher. The magnetic field previously created will be destroyed to maintain the current flow towards the load 114. Thus, the polarity will be reversed (e.g., left side of inductor 106 will be negative). As a result, two sources (the input voltage 104 and the inductor 106) will be in series, causing a higher voltage to charge the capacitor 112 through the diode 108.

Figure 2:
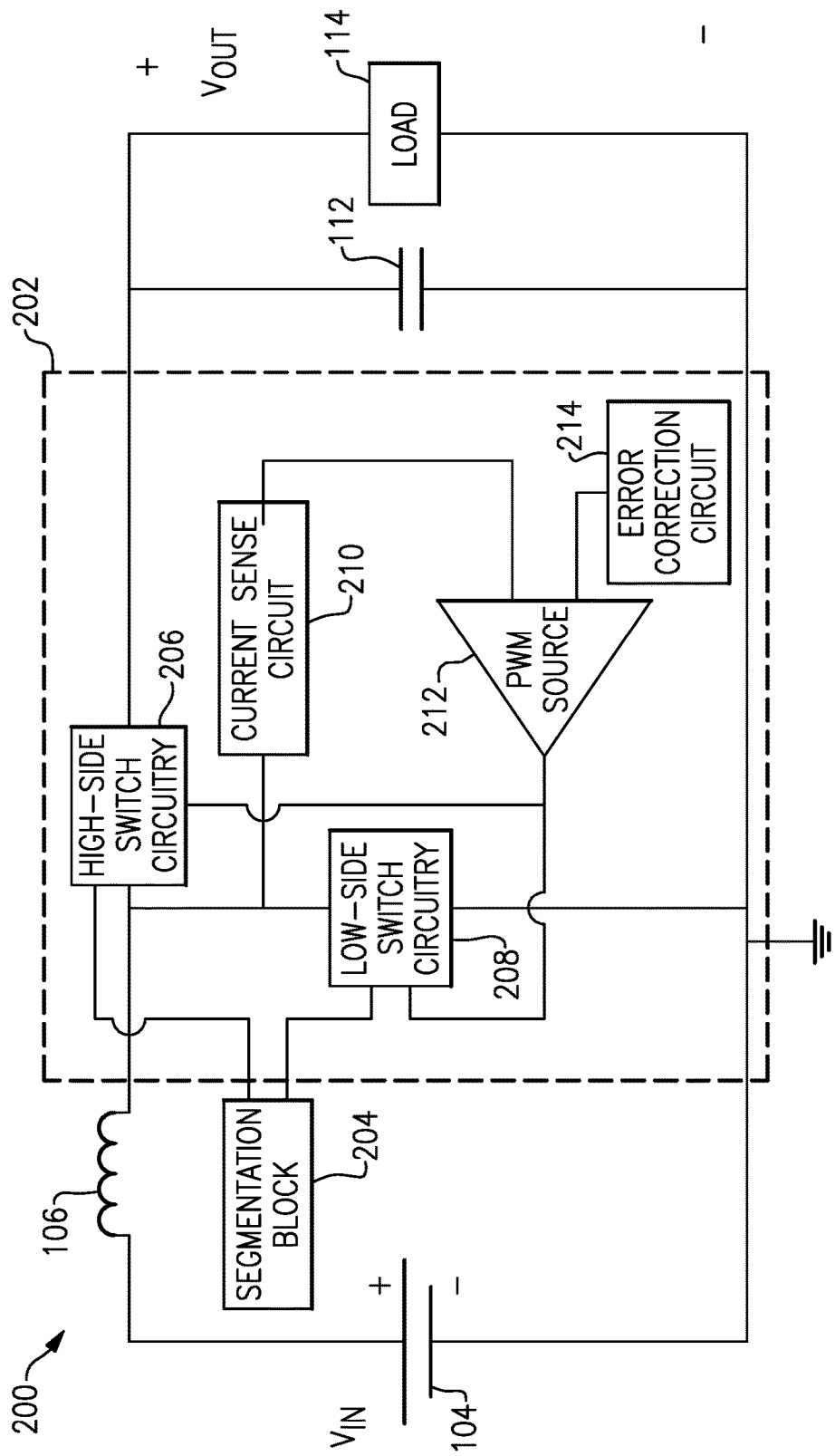
FIG. 2 illustrates a circuit diagram of a voltage converter in accordance with some embodiments.

FIG. 2 illustrates a circuit diagram of a voltage converter 200 in accordance with some embodiments. Components such as input voltage 104, inductor 106, capacitor 112 and load 114 have the same characteristics as described with respect to elements with like reference numerals in FIG. 1. FIG. 2 illustrates switching circuitry 202, which in this example includes high-side switch circuitry 206, low-side switch circuitry 208, a pulse-width modulation source 212, a current sense circuit block 210 and an error correction circuit 214. In some embodiments, a segmentation block 204 is included in switching circuitry 202. In some embodiments, segmentation block 204 is external to switching circuitry 202, for instance in a distinct module, circuit block, printed circuit board or die from the rest of voltage converter 200 and/or switching circuitry 202.

A comparison between FIG. 1 and FIG. 2 illustrates that high-side switch circuitry 206 is functionally comparable to diode 108, but may include more logic, inputs and outputs. Similarly, low-side switch circuitry 208 is functionally comparable to switch 110, but may include more logic, inputs and outputs. In some embodiments, high-side switch circuitry 206 and/or low-side switch circuitry 208 is a circuit block or module comprising one or more switching elements, such as bipolar junction transistors (BJT), field-effect transistors (FET), organic-based transistors, multi-gate devices or other transistors and diodes.

In some embodiments, high-side switch circuit block 206 includes a plurality of switching elements, such as transistors, and has an input signal (or control signal) from segmentation block 204 and an input signal from pulse-width modulation source 212. In some embodiments, high-side switch circuit block 206 has combining logic that takes the input signal from the segmentation block 204 and the input signal from PWM source 212, and selectively drives one or more of the plurality of switching elements. These switching elements of the high-side switch circuit block 206 may include transistors or multi-gate devices, each having a gate terminal connected to the combining logic.

In some embodiments, low-side switch circuit block 208 includes a plurality of switching elements, such as transistors, and has an input signal (or control signal) from segmentation block 204 and an input signal from pulse-width modulation source 212. In some embodiments, low-side switch circuit block 206 has combining logic that takes the input signal from the segmentation block 204 and the input signal from PWM source 212, and selectively drives one or more of the plurality of switching elements. These switching elements of the low-side switch circuit block 208 may include transistors or multi-gate devices, each having a gate terminal connected to the combining logic.

FIG. 2 also illustrates implementation of one or more inductive elements (e.g., inductor 106), coupled to an intermediate node coupling high-side switch circuit block 206 and low-side switch circuit block 208. Voltage converter 200 includes a current sense circuit block 210, configured to detect a current level at an intermediate node of voltage converter 200, and compare it to another current level, such as the load current at load 114. In some implementations, the intermediate node of voltage converter 200 is the node coupled to one terminal of inductor 106 and high-side switch circuit block 206 and low-side switch circuit block 208. An output of the current sense circuit 210 is used as an input to PWM source 212, which is used to adjust pulse-width modulation signals sent to high-side switch circuit block 206 and low-side switch circuit block 208. Another input to PWM source 212 is error correction circuit block 214, which takes inputs such as input voltage (Vin), output voltage (Vout) and a reference voltage (Vref) to generate an error correction signal for PWM source 212 to use for making adjustments as well. In some implementations, the intermediate node also couples the one or more inductive elements with block 206, block 208 and current sense circuit 210.

Segmentation block 204 includes logic for enabling, activating or driving one or more switching elements of high-side switch circuit block 206 and one or more switching elements of low-side switch circuit block 208. Segmentation block 204 may use various inputs to determine which switching elements or how many switching elements to enable for a given duration of time. Some inputs to the segmentation block 204 may include output voltage (Vout), load current, input voltage (Vin), and/or an error amplifier output voltage from error correction circuit block 214.

Segmentation block 204 may also have some information stored, or able to be retrieved from local or external memory, such as characteristics of each respective switching element within high-side switch circuit block 206 and low-side switch circuit block 208. For example, segmentation block 204 may be able to determine how many switching elements can be activated within each respective circuit block. Segmentation block 204 may also be able to determine, for example, that a respective switching element is a transistor, and more specifically if it is a transistor driven by a high signal (e.g., NMOS FET) or a low signal (e.g., PMOS FET). Segmentation block 204 may also be able to retrieve information about a respective switching element such as its maximum power rating, maximum current rating or maximum voltage rating across the switch, saturation voltage, maximum frequency of operation, leakage current, or another performance or efficiency parameter.

Segmentation block 204 may also include logic to determine a particular combination of switching elements to enable for a particular output voltage, using one or more inputs such as load current, and one or more characteristics of each switching element such as a performance-related parameter. Segmentation block 204 may also retrieve predetermined switch activation information from a look-up table, for a respective output voltage or load current.

Figure 3A:
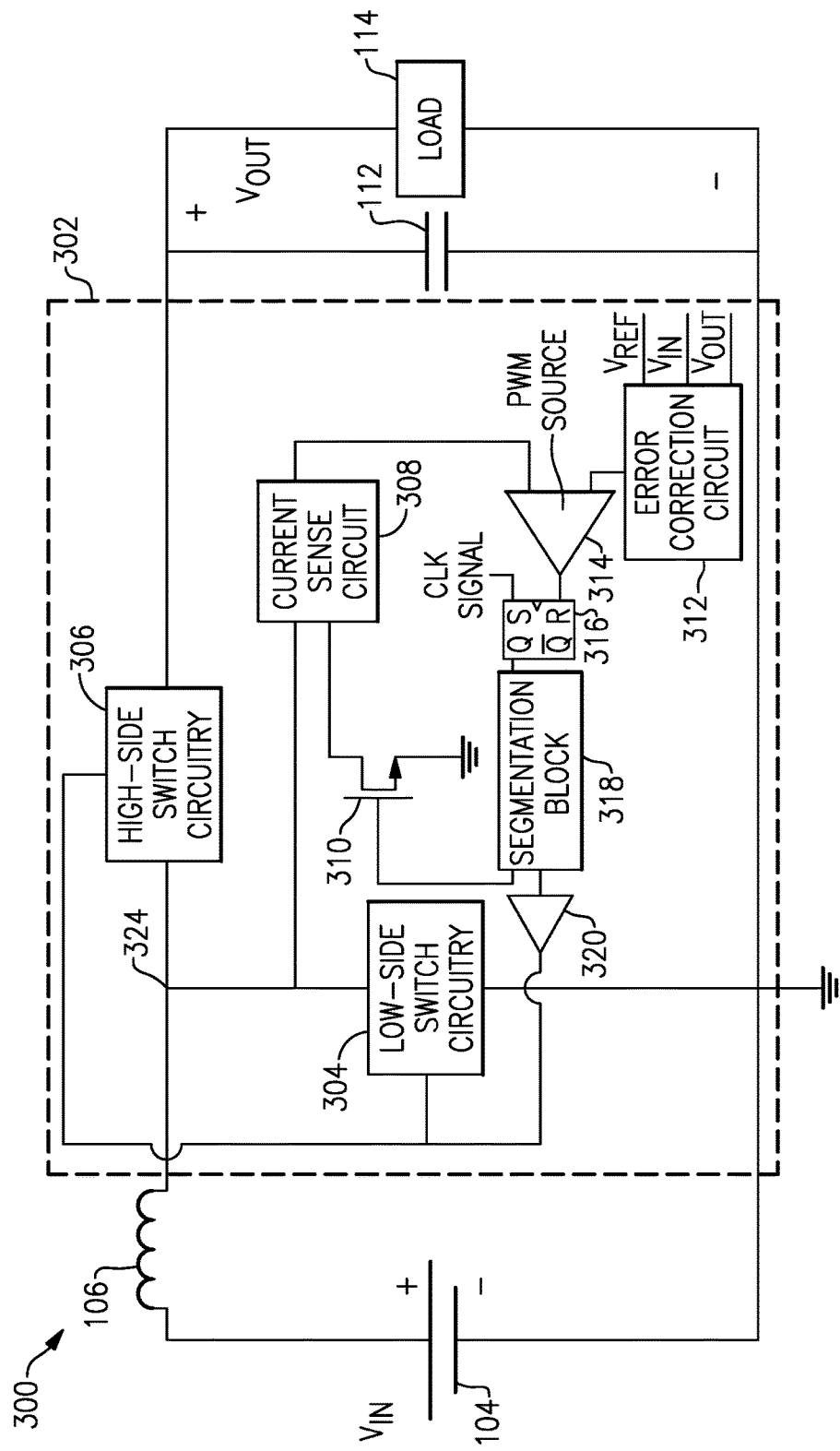
FIG. 3A illustrates a voltage converter with segmentation block within switching circuitry, in accordance with some embodiments.

FIG. 3A illustrates a voltage converter 300 with segmentation block 318 within switching circuitry 302, in accordance with some embodiments. In the example voltage converter 300, high-side switch circuit block 306 may have some or all of the characteristics of high-side switch circuit block 206 and low-side switch circuit block 304 may have some or all of the characteristics of low-side switch circuit block 208 as described above with respect to FIG. 2. Similarly, current sense circuit 308, PWM source 314 and error correction circuit block 312 may have some or all of the characteristics of current sense circuit 210, PWM source 212 and error correction circuit 214 of FIG. 2, respectively.

FIG. 3A illustrates that in some embodiments, segmentation block 318 is in the signal path of PWM source 314 and optionally a flip-flop 316 or another pulse-generating element. In such embodiments, segmentation block 318 includes logic to combine an input signal from PWM source 314 and/or flip-flop 316 with a segmentation decision to selectively drive one or more switching elements within high-side switch circuit block 306 and one or more switching elements within low-side switch circuit block 304. In some embodiments, segmentation block 318 is coupled to a plurality of driver circuits such as driver 320, where a respective driver circuit is coupled to a respective switching element of high-side switch circuit block 306 or low-side switch circuit block 304. In some embodiments, segmentation block 318 drives a gate of a transistor 310 coupled to an input of current sense circuit 308.

Figure 3B:
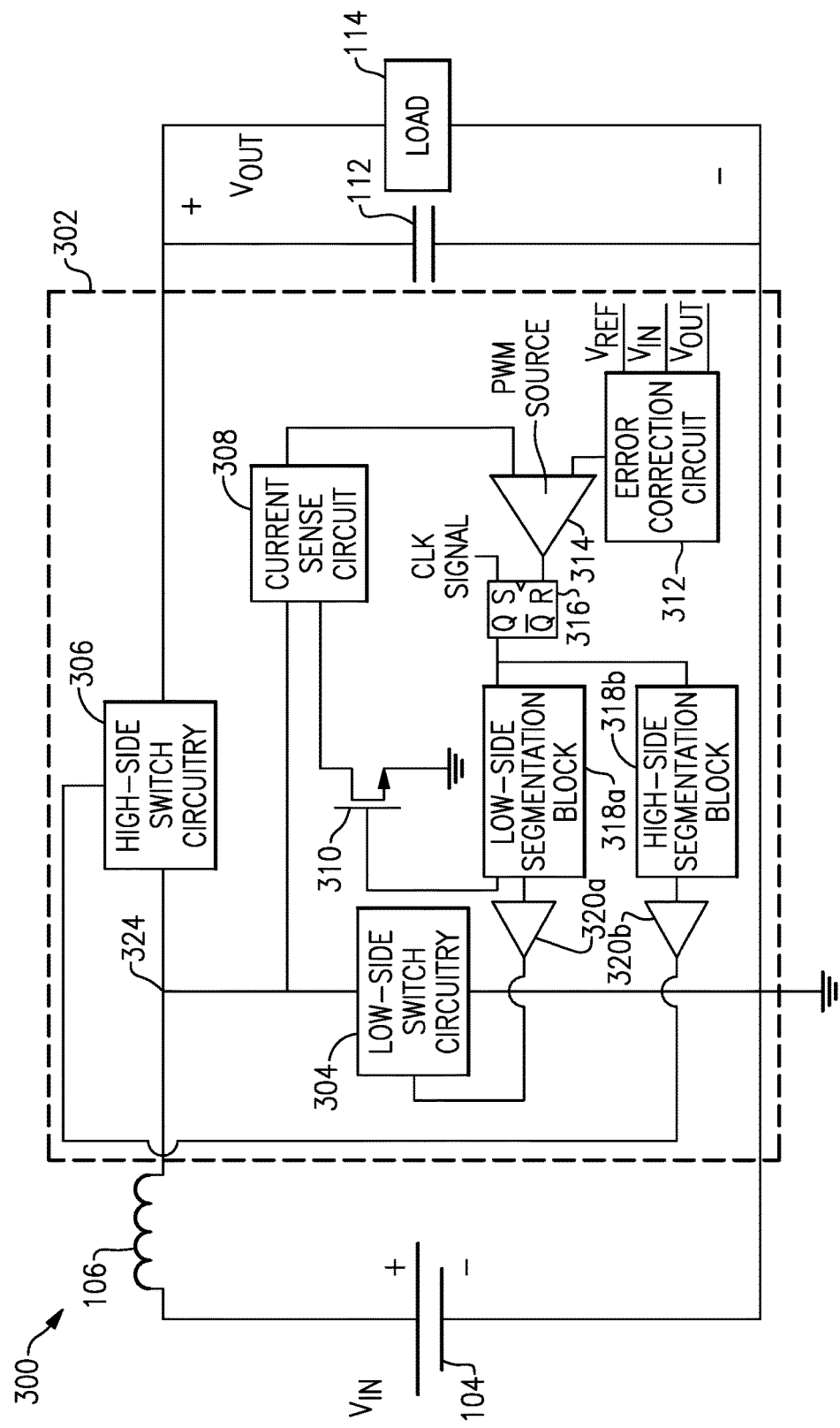
FIG. 3B illustrates an example voltage converter with a low-side segmentation block and a high-side segmentation block in accordance with some embodiments.

FIG. 3B illustrates an example voltage converter 300 with the logic of a single segmentation block 318 of FIG. 3A, split into a low-side segmentation block 318a and a high-side segmentation block 318b. FIG. 3B also illustrates low-side segmentation block 318a coupled to a driver 320a representing one or more driver circuits, each respective driver circuit coupled to a respective switching element of low-side switch circuit block 304, and high-side segmentation block 318b coupled to a driver 320b representing one or more driver circuits, each respective driver circuit coupled to a respective switching element of high-side switch circuit block 306. While FIG. 3B illustrates segmentation blocks 318a and 318b coupled to PWM source 314, in some embodiments, segmentation blocks 318a and 318b are not coupled to PWM source 314 as shown and described with respect to FIG. 2.

Figure 4A:
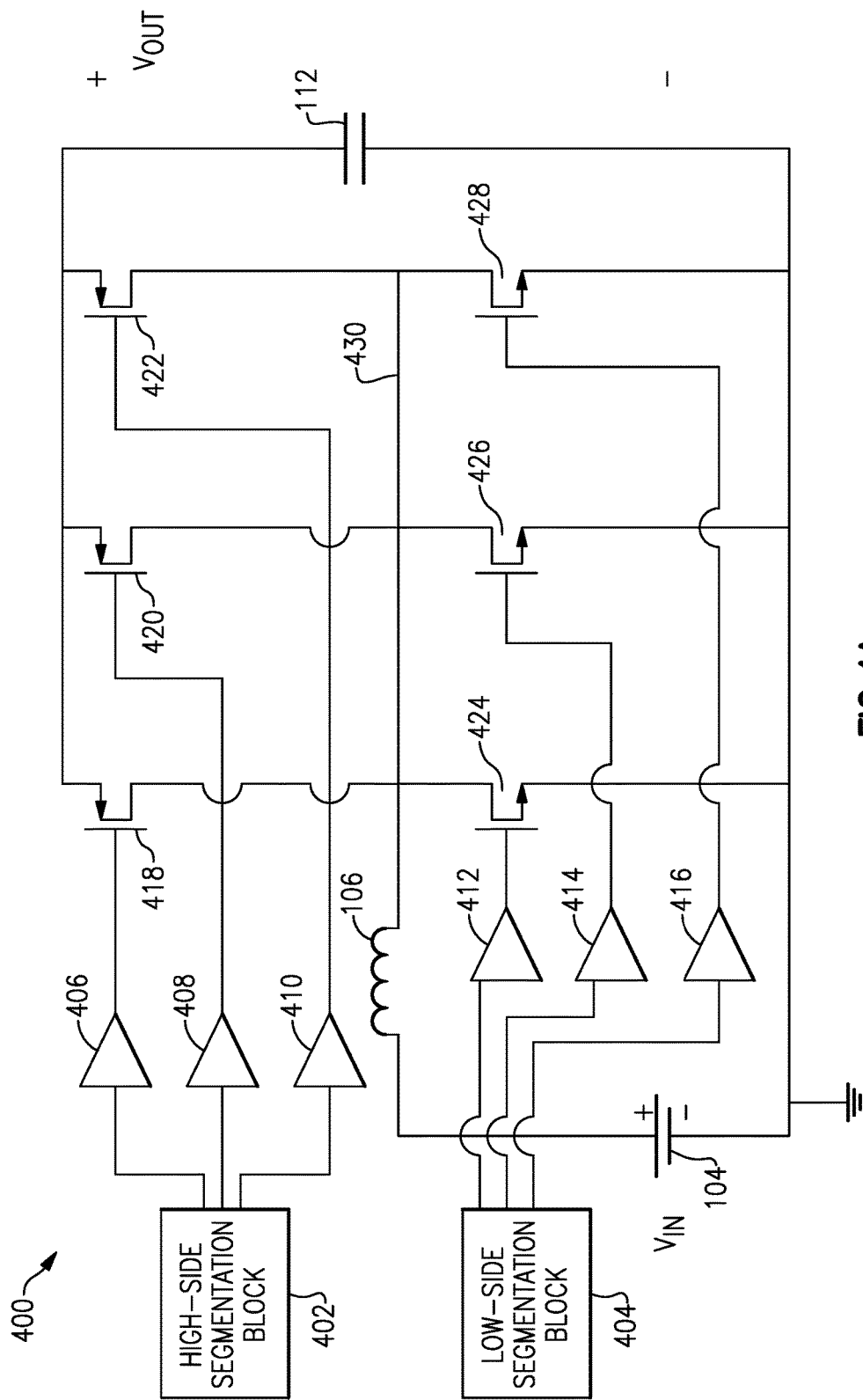
FIG. 4A illustrates components of a voltage converter involved with selectively activating one or more switching elements in accordance with some embodiments.

FIG. 4A illustrates components of a voltage converter 400 involved with selectively activating one or more switching elements. While voltage converter 400 shows a total of six transistors, it is not limited to this number of switching elements or this type of switching element. FIG. 4A shows a high-side segmentation block 402 coupled to three drivers 406, 408 and 410 and a low-side segmentation block 404 coupled to three drivers 412, 414 and 416. In some embodiments, each of high-side segmentation block 402 and low-side segmentation block 404 receives an input from a pulse-width modulating source, and combines that with a segmentation decision to selectively activate one of more switching elements (e.g., transistors 418, 420, 422, 424, 426 or 428) through an associated driver circuit. In some embodiments, each respective driver 406, 408, 410, 412, 414, and 416 receives an input from a pulse-width modulating source, along with an input from high-side segmentation block 402 or low-side segmentation block 404. In such embodiments, each driver circuit has logic to combine these signals and selectively activate a respective switching element. The voltage converter 400 essentially creates a larger switching device for higher efficiency during higher current loading levels and a smaller switching device with lower parasitic effects and improved efficiency during lower current loading levels, by allowing selective enablement of each switching element of the plurality of switching elements.

FIG. 4A also illustrates the use of PMOS transistors for transistors 418, 420 and 422. In some embodiments, switching elements coupled to the high-side segmentation block 402 are referred to as high-side switching elements. In some embodiments, high-side switch circuit blocks such as the ones described with respect to FIGS. 2, 3A and 3B include high-side switching elements, such as PMOS transistors 418, 420 and 422. FIG. 4A also illustrates the use of NMOS transistors for transistors 424, 426 and 428. In some embodiments, switching elements coupled to the low-side segmentation block 404 are referred to as low-side switching elements. In some embodiments, low-side switch circuit blocks such as the ones described with respect to FIGS. 2, 3A and 3B include low-side switching elements, such as NMOS transistors 424, 426 and 428.

FIG. 4A illustrates an intermediate node 430, such that one terminal of inductor 106 and a respective terminal of a high-side or low-side switching element is coupled to the intermediate node 430. Voltage converter 400 is configured such that one or more high-side switching elements such as transistors 418, 420 and 422 can be closed at the same time. Voltage converter 400 is further configured such that one or more low-side switching elements such as transistors 424, 426 and 428 can be closed at the same time. In some embodiments, a respective high-side switching element cannot be closed at the same time as a respective low-side switching element. For example, high-side segmentation block 402, low-side segmentation block 404, a PWM source and/or drivers 406, 408, 410, 412, 414 and 416 have logic to prevent high-side and low-side switching elements from being enabled at the same time.

While in some embodiments an equivalent oscillating drive signal from a respective driver circuit may be used for each of a plurality of high-side or low-side switching elements during a high current output state, in some implementations, the drive signals can be different. For example, the drive signals can switch on a first one of the high-side switching elements quickly and a second one of the high-side switching elements more slowly to achieve a reasonable transition of the high-side switch circuit block with lower static resistance and lower gate charging. Similarly, the drive signals can switch off a first one of the switching elements before switching off a second one of the switching elements, for example, so that the smaller of the switching elements is switched off with lower discharge loss.

Figure 4B:
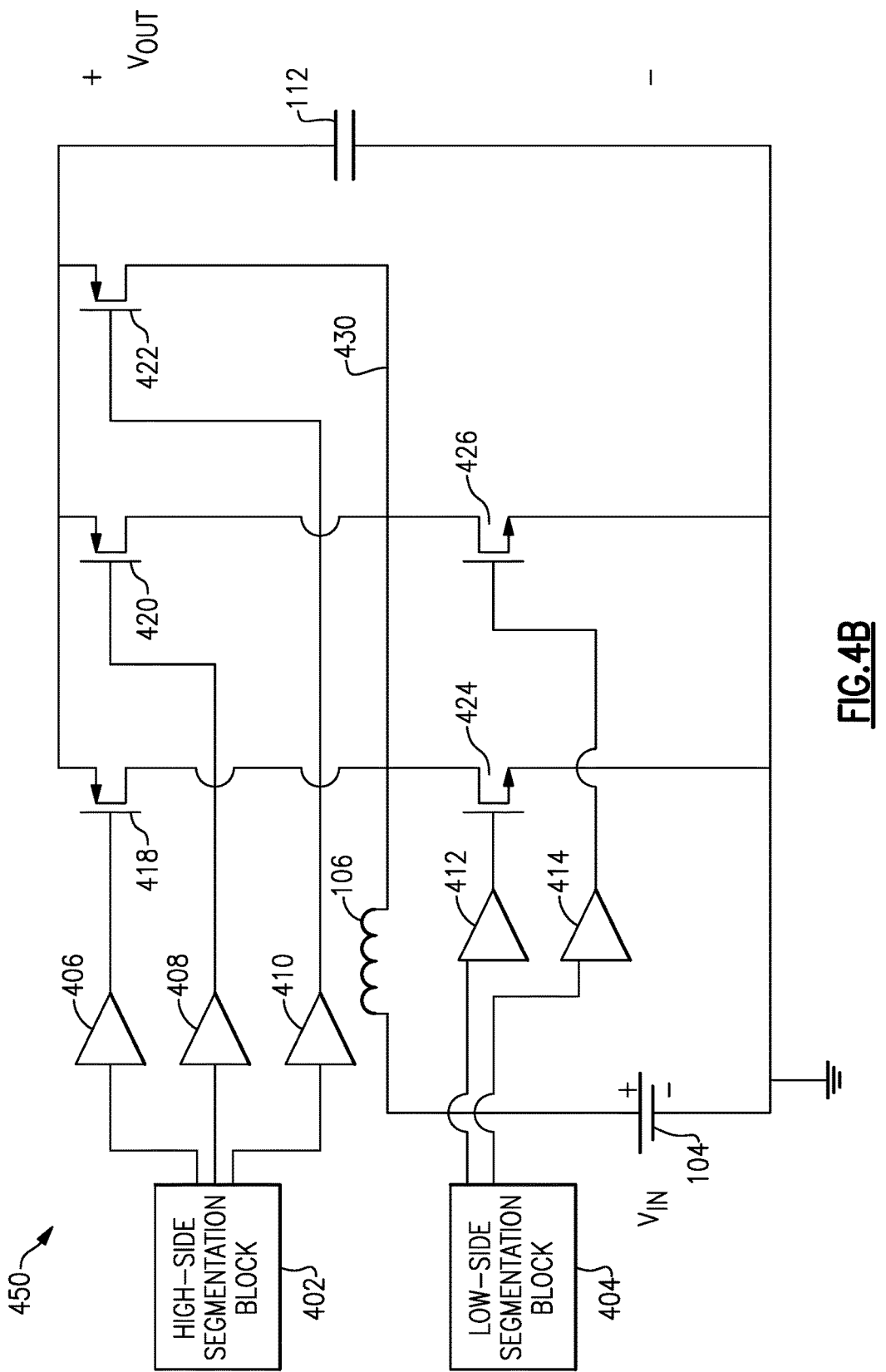
FIG. 4B illustrates a voltage converter showing an unequal number of high-side switching elements and low-side switching elements in accordance with some embodiments.

FIG. 4B illustrates a voltage converter 450 showing that in some embodiments there is an unequal number of high-side switching elements (e.g., transistors 418, 420, 422) and low-side switching elements (e.g., transistors 424 and 426). It should be noted for voltage converter 400 and 450, that driving less than all of a plurality of switching elements can be combined with methods of pulse-skip modulation, frequency adjustment to lower switching frequencies at lower powers, and duty-cycle modulations to enable low power efficiency in these voltage converters.

Figure 4C:
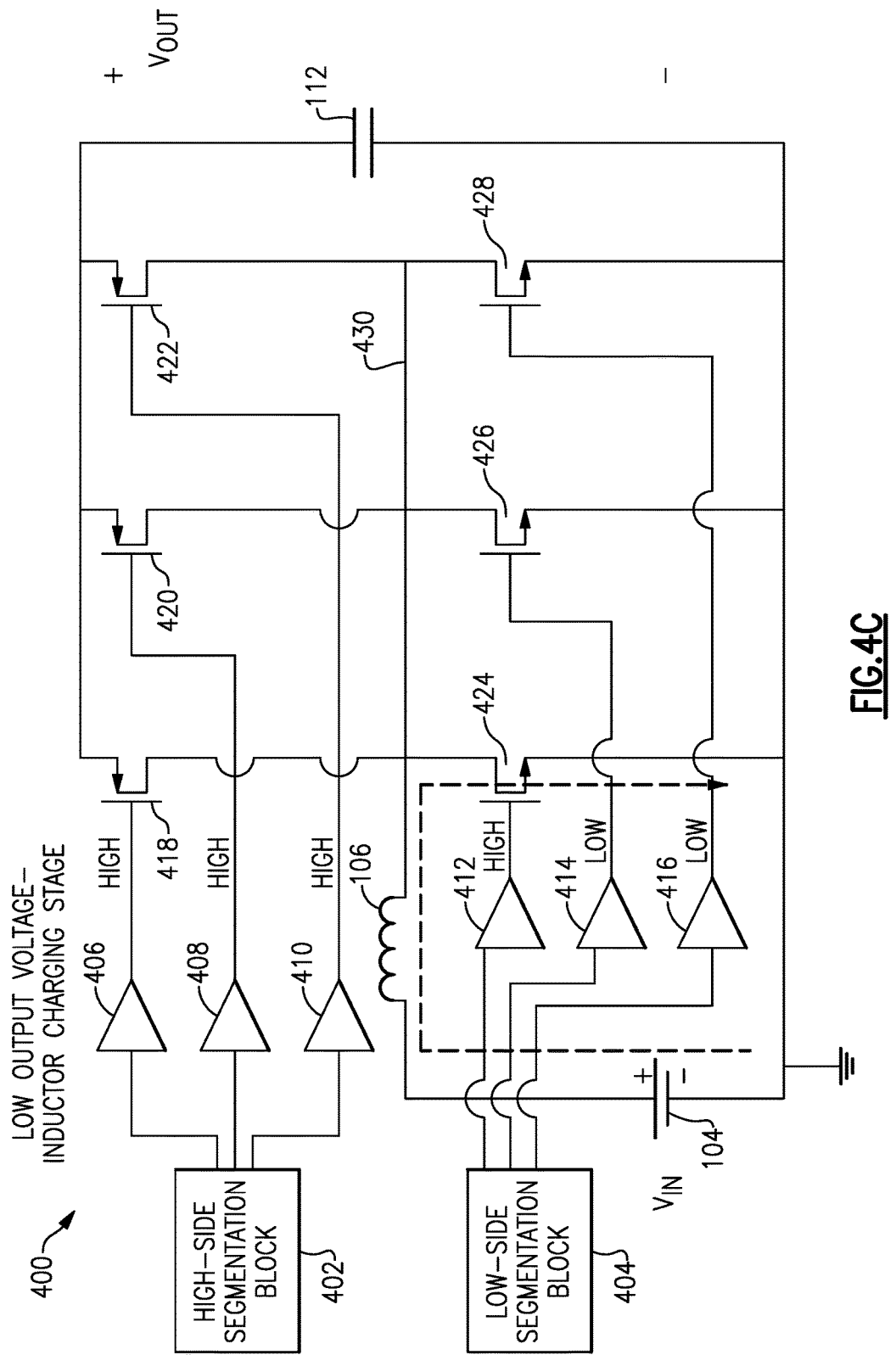
FIG. 4C illustrates respective drive signals applied to the gate of each respective transistor in accordance with some embodiments.

FIG. 4C illustrates respective drive signals applied to the gate of each respective transistor. In the particular case of voltage converter 400 in FIG. 4C, there is a need for a relatively low boosted output voltage, and the voltage converter 400 is in a stage of charging inductor 106 to subsequently provide that low boosted output voltage. Here, it can be seen that a high voltage signal applied to the gate of NMOS transistor 424 closes that one low-side switching element, while the low signals applied to the gates of transistors 426 and 428 keep those low-side switching elements open. Additionally, high signals are applied to the gates of PMOS transistors 418, 420 and 422 to keep them open. As a result, a current flows from the input voltage source 104, through inductor 106 and only through transistor 424.

In voltage converters such as the ones described herein, most of the power lost during normal operation is in the switching elements. These losses include conduction losses through a respective switch, represented by $I^2R$, where I is the current through the switch and R is the resistance of the switch when it is turned on. Additional losses include gate-drive losses or switching losses due to charging and discharging capacitive components of a respective switch. During low output power conditions, it is efficient to activate fewer switching elements for charging or discharging inductor 106, to minimize switching losses. During high output power conditions, it is efficient to activate more switching elements for charging or discharging inductor 106 to minimize conduction losses.

Figure 4D:
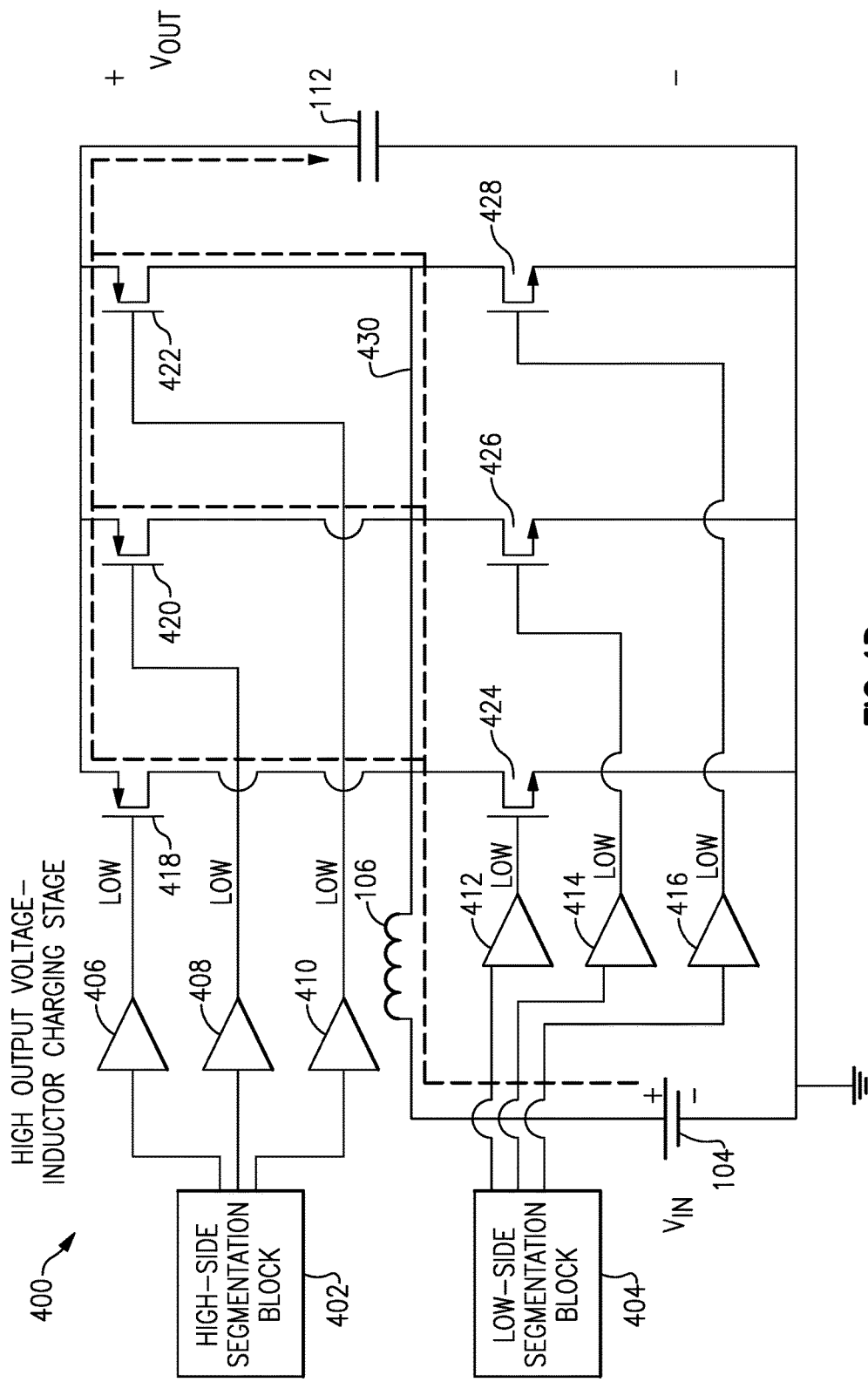
FIG. 4D illustrates respective drive signals applied to the gate of each respective transistor, while inductor is discharging and there is a need for a relatively high boosted output voltage in accordance with some embodiments.

FIG. 4D illustrates respective drive signals applied to the gate of each respective transistor, while inductor 106 is discharging and there is a need for a relatively high boosted output voltage. Here it can be seen that applying a low voltage signal to the gates of PMOS transistors 418, 420 and 422 closes each of these high-side switching elements, allowing current to flow from input voltage source 104, through intermediate node 430 and through each high-side switching element. on the path to a load and capacitor 112. In this example, the high-side segmentation block enables all three transistors 418, 420 and 422 to minimize conduction losses in this inductor discharging stage.

Figure 5:
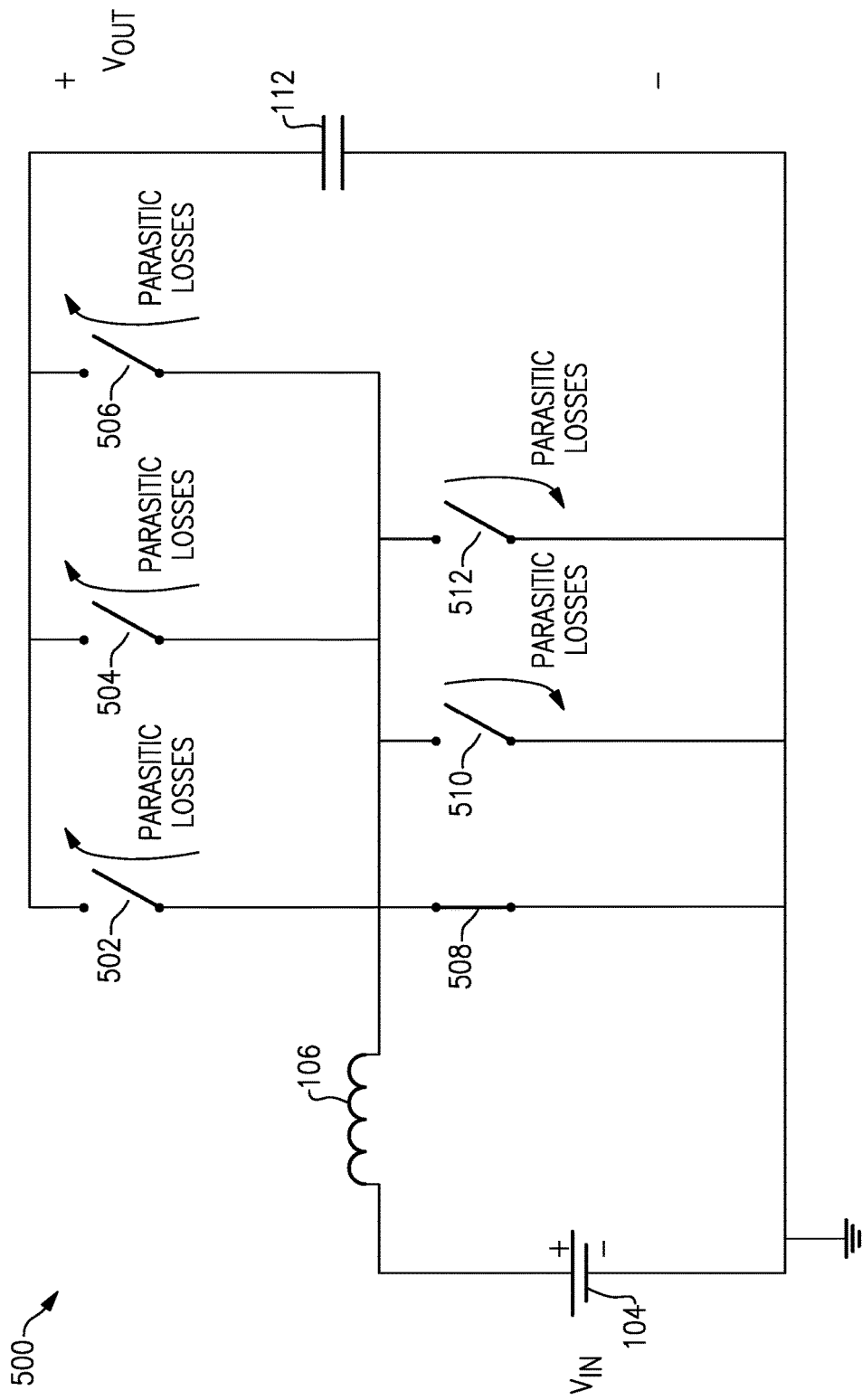
FIG. 5 illustrates a simplified voltage converter with a plurality of high-side switching elements and a plurality of low-side switching elements in accordance with some embodiments.

FIG. 5 illustrates a simplified voltage converter 500 with a plurality of high-side switching elements 502, 504, 506 and a plurality of low-side switching elements 508, 510 and 512 in accordance with some implementations. FIG. 5 illustrates that in addition to conduction losses and switching losses, switching elements of a voltage converter 500 incur parasitic losses while in an open state. For instance, switching element 508 is closed, however, switching elements 502, 504, 506, 510 and 512 are coupled to switching element 508, and therefore still incur some parasitic losses while current flows through closed switch 508.

Figure 6:
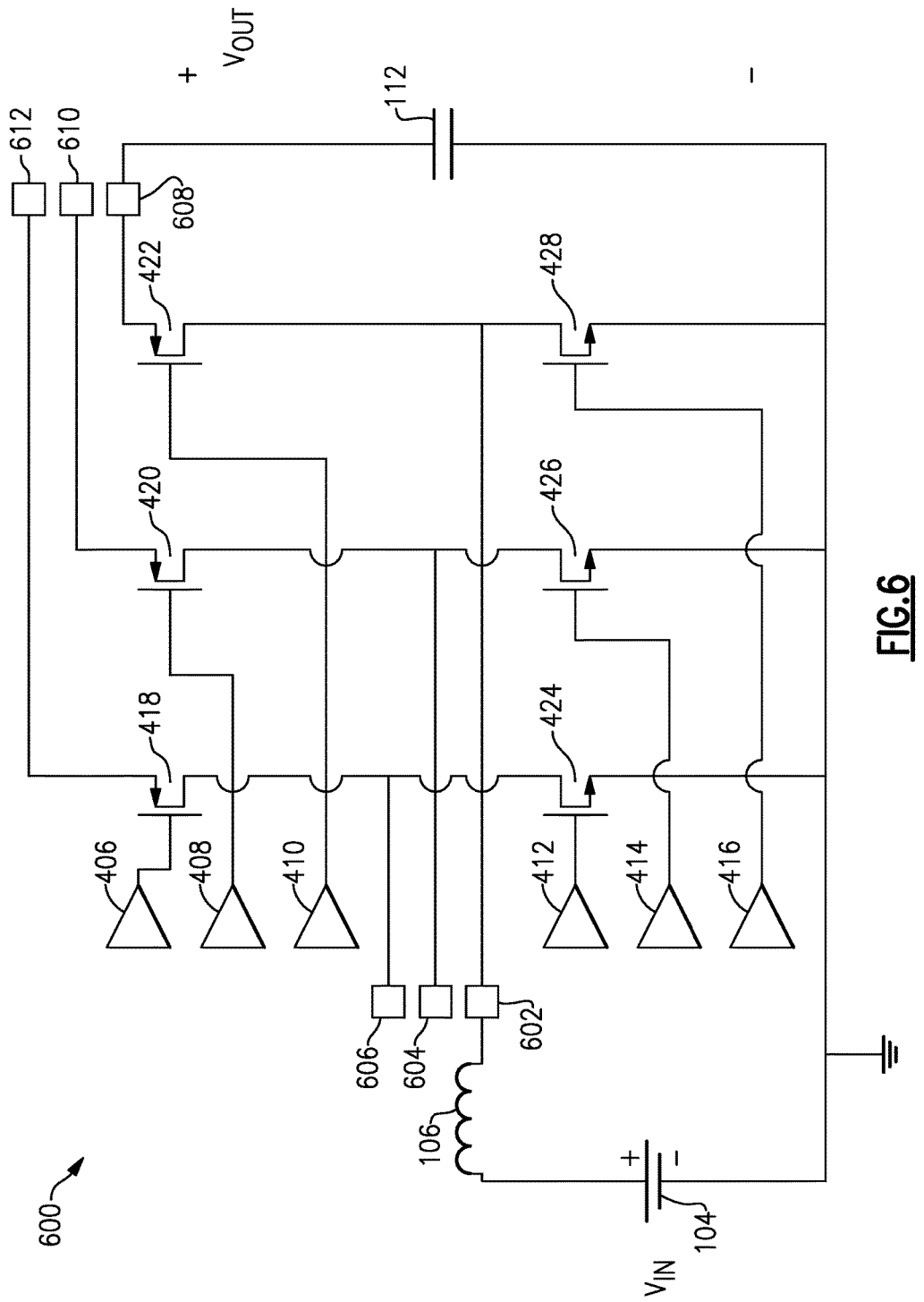
FIG. 6 illustrates a modification to the voltage converter of FIGS. 4A-4D in accordance with some embodiments.

FIG. 6 illustrates a modification to voltage converter 400 of FIGS. 4A to 4D, to physically disconnect one or more switching branches of voltage converter 600. This option to physically connect or disconnect branches of switching elements within voltage converter 600 provides a technique to avoid incurring parasitic losses through switching elements of disconnected branches.

Voltage converter 600 illustrates the implementation of three switching branches, including a first switching branch which includes high-side switching element 422 (e.g., a PMOS transistor) and low-side switching element 428 (e.g., an NMOS transistor), a second switching branch which includes high-side switching element 420 and low-side switching element 426, and a third switching branch which includes high-side switching element 418 and low-side switching element 424. In some embodiments, a respective switching branch includes a branch-intermediate node, similar to intermediate nodes discussed with respect to FIGS. 1-5. For example, the first switching branch includes a first branch-intermediate node 602, the second switching branch includes a second branch-intermediate node 604 and the third switching branch includes a third branch-intermediate node 606. In some embodiments, a respective switching branch includes a branch-output node, similar to output voltage nodes discussed with respect to FIGS. 1-5. For example, the first switching branch includes a first branch-output node 608, the second switching branch includes a second branch-output node 610 and the third switching branch includes a third branch-output node 612.

As can be seen in FIG. 6, this branched topology for voltage converter 600 includes at least one switching branch electrically connected to the rest of the voltage converter 600 circuitry. For example, the first branch-intermediate node 602 is coupled to one terminal of inductor 106, and the first branch-output node 608 is coupled to one terminal of capacitor 112. In some implementations, a respective switching branch requires one high-side switching element and one low-side switching element. In some implementations, a respective switching branch includes at least of a high-side switching element and a low-side switching element.

Figure 7:
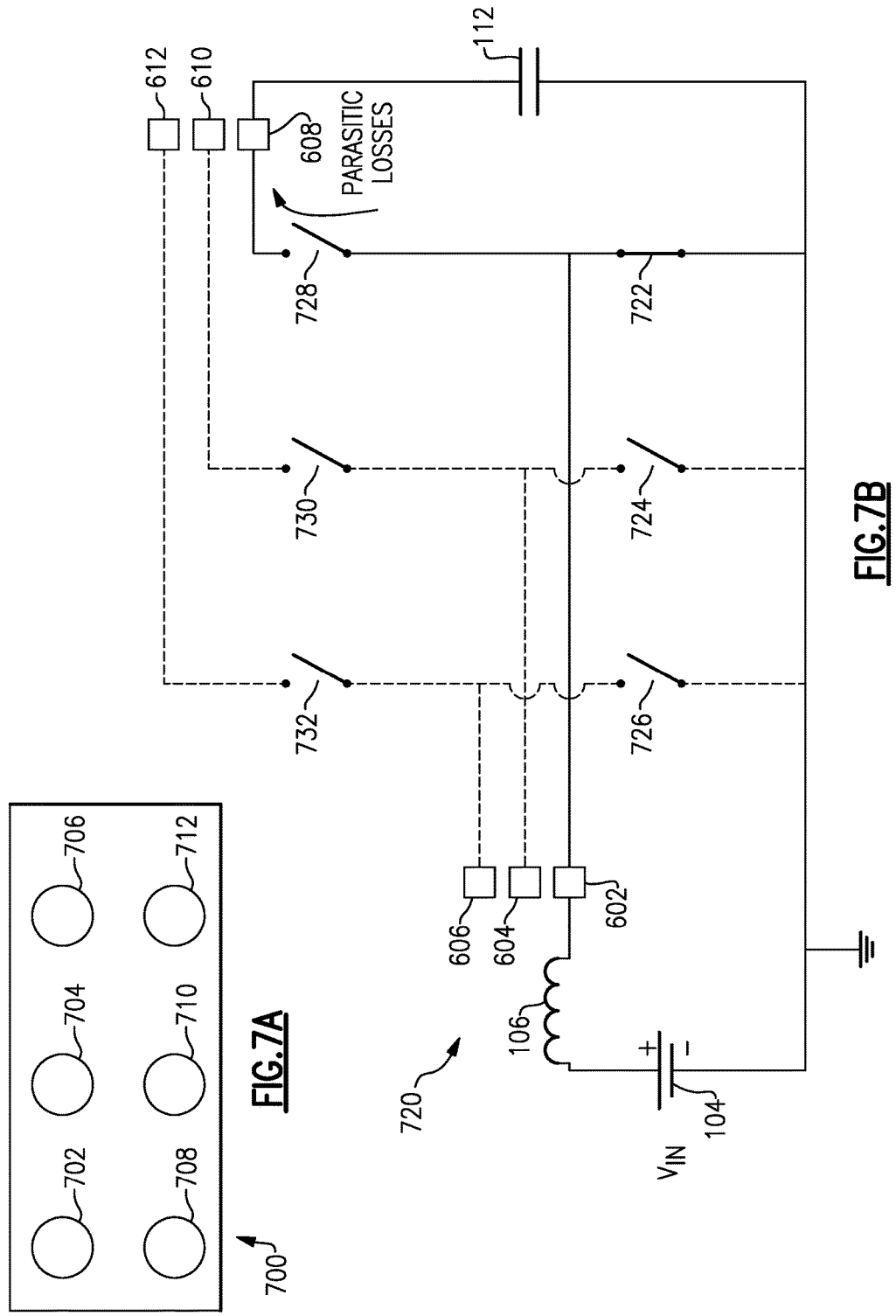
FIG. 7A illustrates a set of branch-intermediate ports associated with the branch-intermediate nodes of respective switching branches, and a set of branch-output ports associated with the branch-output nodes of respective switching branches in accordance with some embodiments.
FIG. 7B illustrates a voltage converter with a switching element of a first switching branch closed in accordance with some embodiments.

FIG. 7A illustrates a set of branch-intermediate ports 702, 704 and 706 associated with the branch-intermediate nodes of respective switching branches, and a set of branch-output ports 708, 710 and 712 associated with the branch-output nodes of respective switching branches. In some embodiments, a respective branch-intermediate port or branch-output port is a bonding element such as a pad, solder ball, pin or post on a semiconductor device, configured to be able to be connected to another such bonding element (e.g., by solder). In FIG. 7A, none of the ports are connected to another, indicating only the first switching branch is electrically connected to the voltage converter 720 of FIG. 7B.

FIG. 7B illustrates voltage converter 720 with switching element 722 of a first switching branch closed. In this implementation, while the circuitry for a second switching branch and third switching branch are present, the second and third branches are not electrically connected to the voltage converter 720 circuitry. As a result, there are no parasitic losses seen across switching elements 732, 730, 726 and 724. However, there is still some parasitic loss seen across open switch 728, which is a part of the first switching branch.

Figure 8:
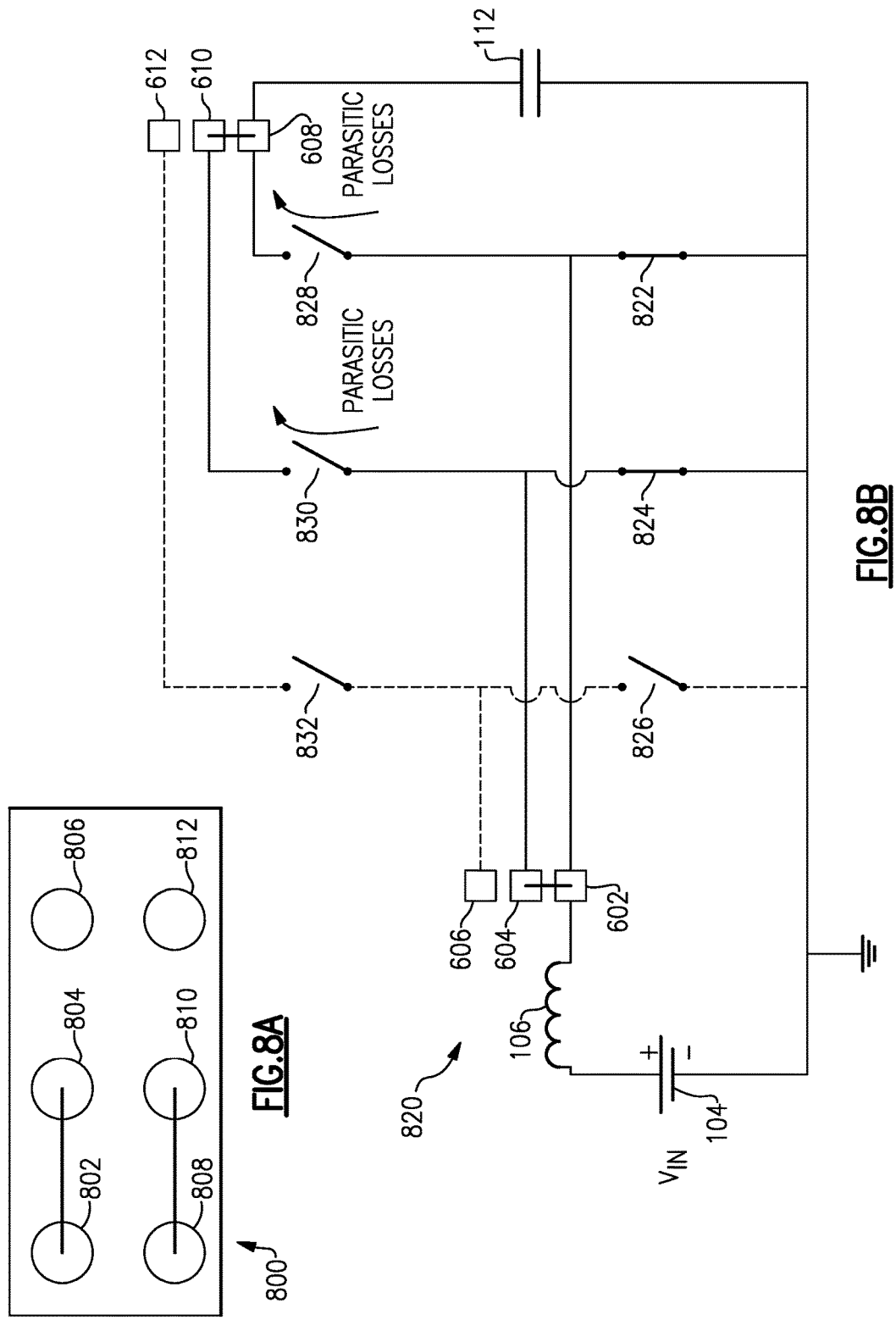
FIG. 8A illustrates a voltage converter with a configuration including a first switching branch and a second switching branch electrically coupled in accordance with some embodiments.
FIG. 8B illustrates a voltage converter with a configuration including a first switching branch and a second switching branch electrically coupled in accordance with some embodiments.

FIGS. 8A and 8B illustrate voltage converter 820 with a configuration including a first switching branch and a second switching branch electrically coupled. FIG. 8A illustrates a physical connection formed between branch-intermediate port 802 connected to branch-intermediate node 602, and branch-intermediate port 804 connected to branch-intermediate node 604 of voltage converter 820. Similarly, a physical connection is shown to be formed between branch-output port 808 connected to branch-output node 608 and branch-output port 810 connected to branch-output node 610 of voltage converter 820. FIG. 8B illustrates that the first switching branch comprising switch 822 and switch 828, and the second switching branch comprising switch 824 and switch 830 are electrically connected to the voltage converter 820 circuitry, while the third switching branch is not connected. Consequently, parasitic losses are seen across switch 830 and switch 828, while switch 824 and switch 822 are each closed.

Figure 9:
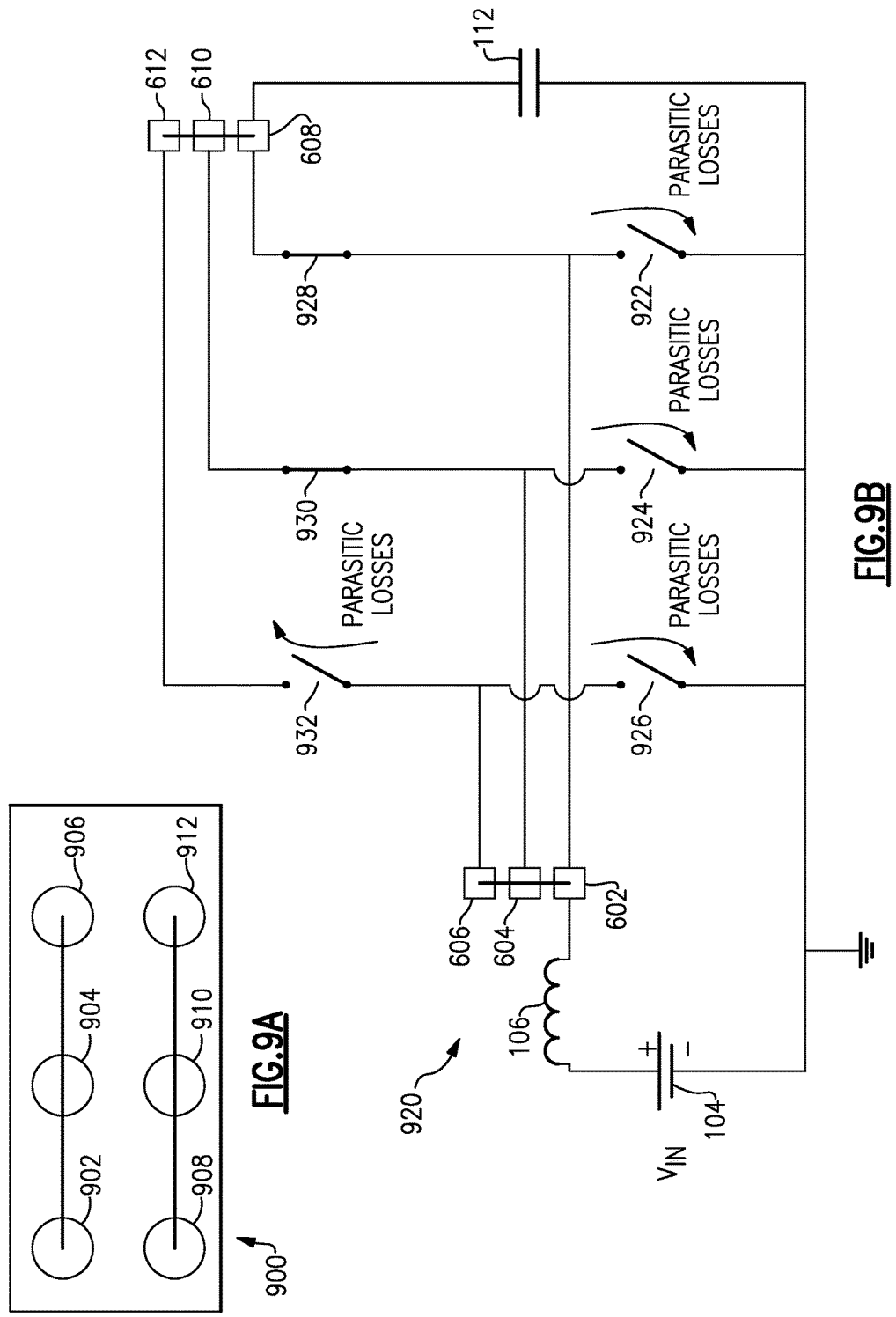
FIG. 9A illustrates a voltage converter with a configuration including a first switching branch, a second switching branch and a third switching branch electrically coupled in accordance with some embodiments.
FIG. 9B illustrates a voltage converter with a configuration including a first switching branch, a second switching branch and a third switching branch electrically coupled in accordance with some embodiments.

FIGS. 9A and 9B illustrate voltage converter 920 with a configuration including a first switching branch, a second switching branch and a third switching branch electrically coupled. FIG. 9A illustrates a physical connection formed between branch-intermediate port 902 connected to branch-intermediate node 602, branch-intermediate port 904 connected to branch-intermediate node 604 and branch-intermediate port 906 connected to branch-intermediate node 606 of voltage converter 920. Similarly, a physical connection is shown to be formed between branch-output port 908 connected to branch-output node 608, branch-output port 910 connected to branch-output node 610 and branch-output port 912 connected to branch-output node 612 of voltage converter 920. FIG. 9B illustrates that the first switching branch comprising switch 922 and switch 928, the second switching branch comprising switch 924 and switch 930 and the third switching branch comprising switch 926 and switch 932 are electrically connected to the voltage converter 920 circuitry. Consequently, parasitic losses are seen across switches 932, 926, 924 and 922, while switch 930 and switch 928 are each closed during an inductor discharging stage.

In some implementations, the branched switch topology of FIGS. 6-9B provide a flexible option for implementing or not implementing sets of switches in a voltage converter, if it is known that a particular application of the voltage converter does or does not require relatively high output voltages.

Figure 10:
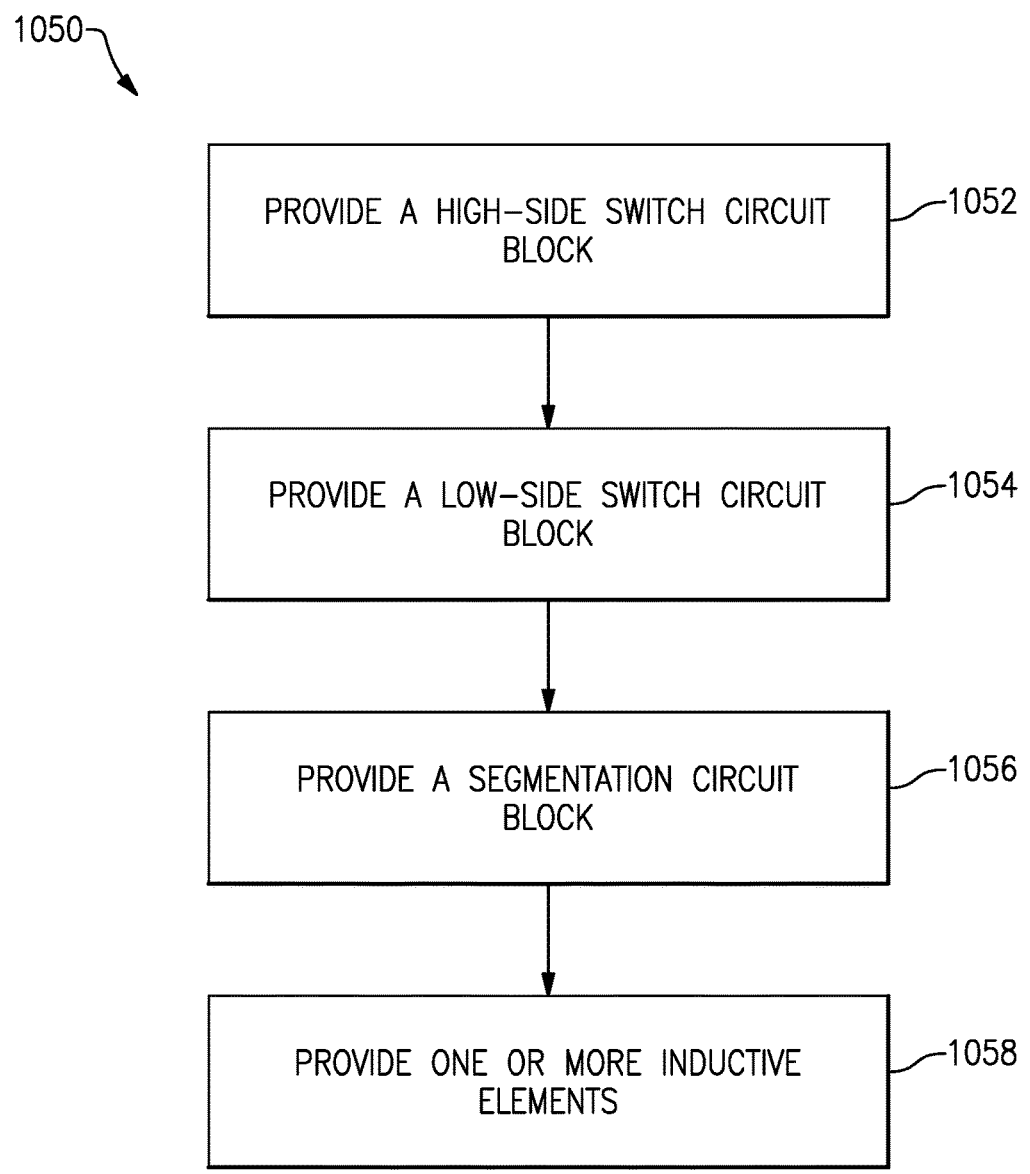
FIG. 10 illustrates a process of implementing a voltage converter in accordance with some embodiments.

FIG. 10 illustrates a process 1050 of implementing a voltage converter in accordance with some embodiments. In some implementations, the process 1050 includes providing a high-side switch circuit block, as depicted by block 1052 and provided herein throughout this disclosure. For example, providing the high-side switch circuit block may include providing or implementing a plurality of high-side switching elements as well.

In some implementations, the process 1050 includes providing a low-side switch circuit block, as depicted by block 1054 and provided herein throughout this disclosure. For example, providing the low-side switch circuit block may include providing or implementing a plurality of low-side switching elements as well.

In some implementations, the process 1050 includes providing a segmentation circuit block, as depicted by block 1056 and provided herein throughout this disclosure. For example, providing the segmentation circuit block may include communicatively coupling the segmentation circuit block to the high-side switch circuit block and communicatively coupling the segmentation circuit block to the low-side switch circuit block as well.

In some implementations, the process 1050 includes providing one or more inductive elements, as depicted by block 1058 and provided herein throughout this disclosure. For example, providing the one or more inductive elements may include providing or implementing the one or more inductive elements coupled to an intermediate node as well. In some implementations, the process 1050 includes coupling the high-side switch circuit block to an intermediate node. In some implementations, the process 1050 includes coupling the low-side switch circuit block to an intermediate node. In some implementations, the process 1050 includes coupling a current sense circuit block to an intermediate node. In some implementations, the process 1050 includes coupling a pulse-width modulation source configured to generate a pulse-width modulated signal to the current sense circuit block and an error correction circuit.

In some implementations, the process 1050 includes coupling the pulse-width modulation source to the high-side switch circuit block and in some implementations the process 1050 includes coupling the pulse-width modulation source to the low-side switch circuit block. In some implementations, the process 1050 includes coupling the pulse-width modulation source to the segmentation circuit block.

In some implementations, the process 1050 includes implementing or providing a plurality of high-side switch drivers, and a plurality of low-side switch drivers and provided herein throughout this disclosure. For example, implementing a respective high-side switch driver includes coupling the high-side switch driver to a respective gate of a respective high-side switching element. In another example, implementing a respective low-side switch driver includes coupling the low-side switch driver to a respective gate of a respective low-side switching element.

In some implementations, the process 1050 includes coupling each high-side switch driver to the high-side segmentation block and includes coupling each low-side switch driver to the low-side segmentation block. In some implementations, the process 1050 includes implementing each of the high-side switching elements in parallel between an output voltage node and the intermediate node, and implementing each of the low-side switching elements in parallel between the intermediate node and a ground potential.

In some implementations the process 1050 includes implementing or providing a plurality of switch-pair branches as provided herein throughout this disclosure.

Figure 11A:
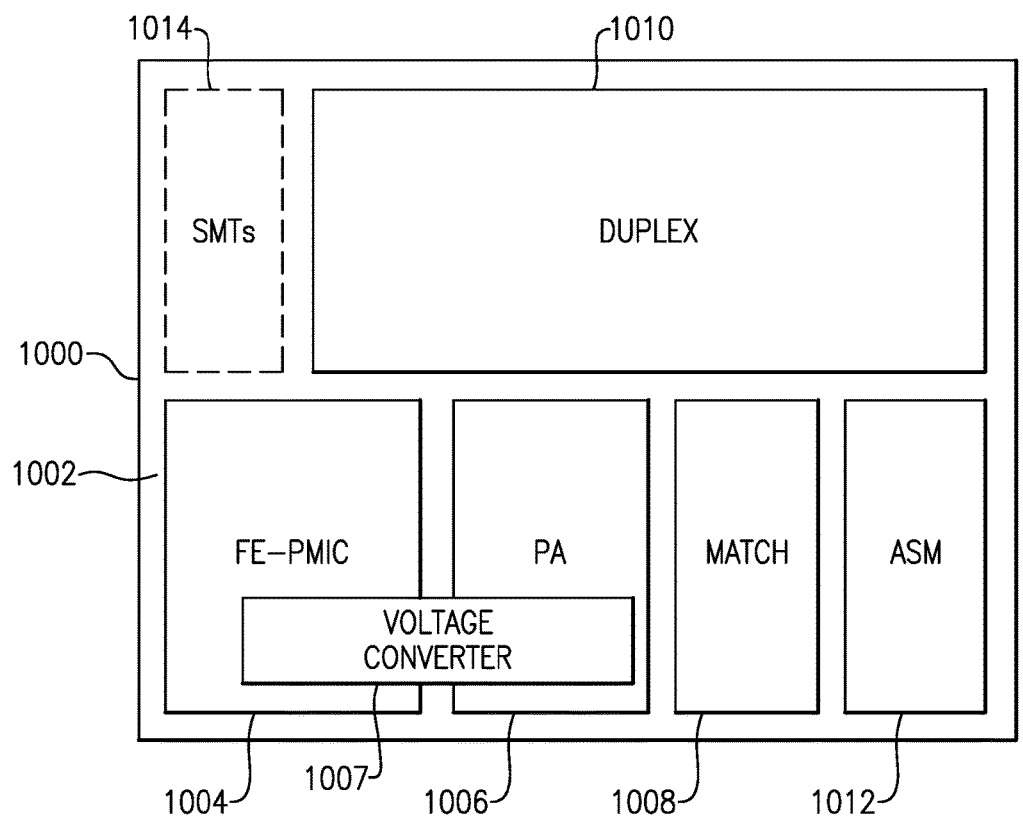
FIG. 11A illustrates implementation of some or all of a power amplification system in a module in accordance with some embodiments.

FIG. 11A shows that in some embodiments, some or all of power amplification systems can be implemented, wholly or partially, in a module. Such a module can be, for example, a front-end module (FEM). An amplification system as described with respect to FIG. 1 typically includes a radio-frequency (RF) amplifier assembly having one or more power amplifiers (PAs). It will be understood that one or more features of the present disclosure can also be implemented in RF amplifier assemblies having other types of RF amplifiers. In some embodiments, an RF amplifier assembly can be implemented on one or more semiconductor die, and such die can be included in a packaged module such as a power amplifier module (PAM) or a front-end module (FEM). Such a packaged module is typically mounted on a circuit board associated with, for example, a portable wireless device.

In the example of FIG. 11A, a module 1000 can include a packaging substrate 1002, and a number of components can be mounted on such a packaging substrate. For example, an FE-PMIC component 1004, a power amplifier assembly 1006, a match component 1008, and a duplexer assembly 1010 can be mounted and/or implemented on and/or within the packaging substrate 1002. The power amplifier assembly 1006 may include a voltage converter 1007 such as those described above with respect to FIGS. 1-9. Other components such as a number of SMT devices 1014 and an antenna switch module (ASM) 1012 can also be mounted on the packaging substrate 1002. Although all of the various components are depicted as being laid out on the packaging substrate 1002, it will be understood that some component(s) can be implemented over other component(s).

In some implementations, a device and/or a circuit having one or more features described herein can be included in an RF device such as a wireless device. Such a device and/or a circuit can be implemented directly in the wireless device, in a modular form as described herein, or in some combination thereof. In some embodiments, such a wireless device can include, for example, a cellular phone, a smart-phone, a hand-held wireless device with or without phone functionality, a wireless tablet, etc.

The voltage converters described with respect to FIGS. 1-9, can be operated as DC-to-DC power converters each with an output voltage greater than its input voltage. Although aspects of the disclosure are described herein with respect to a boost converter, it is to be appreciated that features may be implemented in other types of switched-mode power supply (SMPS) systems, including non-isolated topologies (such as a buck converter, a buck-boost converter, a boost-buck converter, SEPIC [single-ended primary-inductor converter], or a charge pump) and isolated topologies (such as a flyback converter, a half-bridge converter, or a full-bridge converter).

Figure 11B:
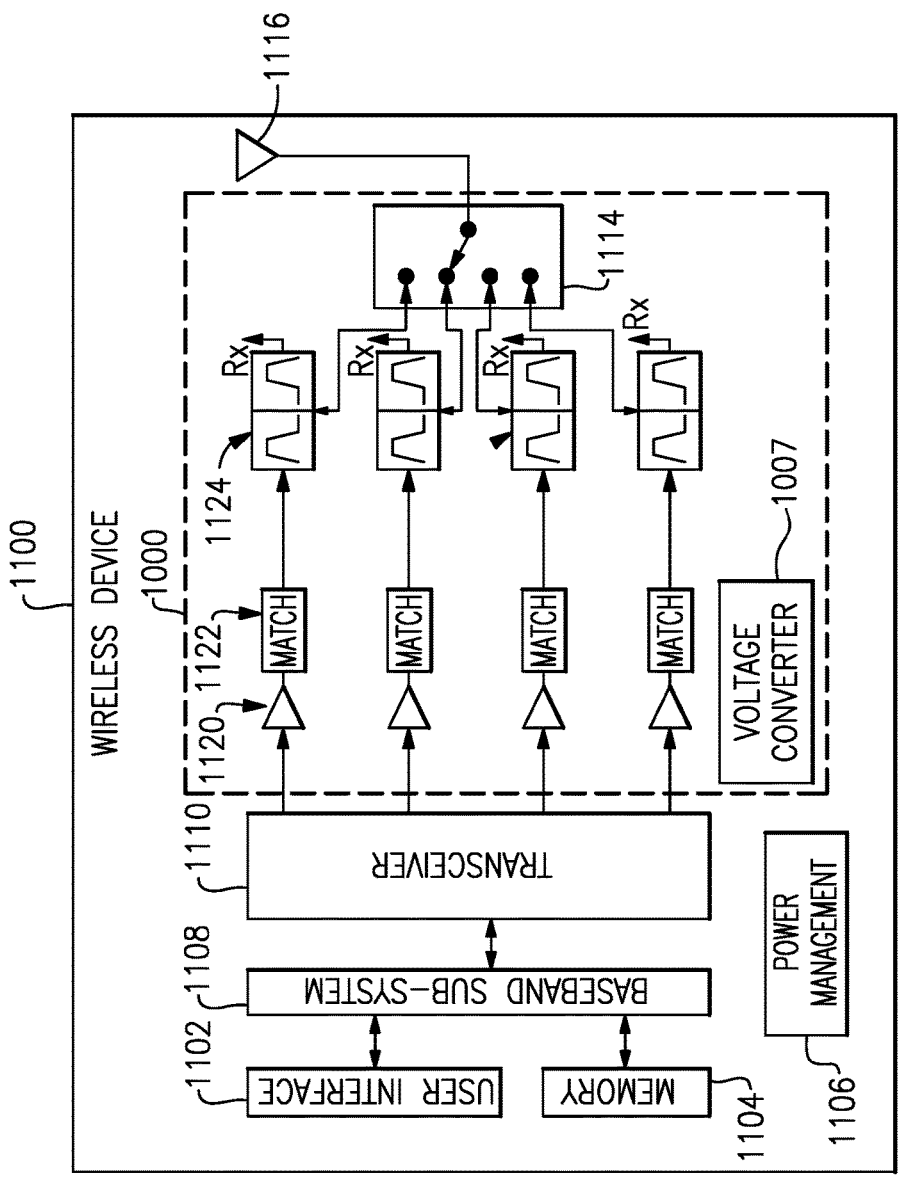
FIG. 11B depicts an example wireless device having one or more advantageous features described herein.

FIG. 11B depicts an example wireless device 1100 having one or more advantageous features described herein. In the context of a module having one or more features as described herein, such a module can be generally depicted by a dashed box 1000, and can be implemented as, for example, a front-end module (FEM).

Referring to FIG. 11B, power amplifiers (PAs) 1120 can receive their respective RF signals from a transceiver 1110 that can be configured and operated in known manners to generate RF signals to be amplified and transmitted, and to process received signals. The transceiver 1110 is shown to interact with a baseband sub-system 1108 that is configured to provide conversion between data and/or voice signals suitable for a user and RF signals suitable for the transceiver 1110. The transceiver 1110 can also be in communication with a power management component 1106 that is configured to manage power for the operation of the wireless device 1100. Such power management can also control operations of the baseband sub-system 1108 and the module 1000.

The baseband sub-system 1108 is shown to be connected to a user interface 1102 to facilitate various input and output of voice and/or data provided to and received from the user. The baseband sub-system 1108 can also be connected to a memory 1104 that is configured to store data and/or instructions to facilitate the operation of the wireless device, and/or to provide storage of information for the user.

In the example wireless device 1100, outputs of the PAs 1120 are shown to be matched (via respective match circuits 1122) and routed to their respective duplexers 1124. Such amplified and filtered signals can be routed to an antenna 1116 through an antenna switch 1114 for transmission. In some embodiments, the duplexers 1124 can allow transmit and receive operations to be performed simultaneously using a common antenna (e.g., 1116). In FIG. 11, received signals are shown to be routed to "Rx" paths (not shown) that can include, for example, a low-noise amplifier (LNA).

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS.

As described herein, one or more features of the present disclosure can provide a number of advantages when implemented in systems such as those involving the wireless device of FIG. 11B. For example, the disclosed architecture may enable effective resizing of the drive transistor of a switched-mode power supply (SMPS) or voltage converter to reduce parasitics during lower power operation.

Although a switching transistor may be described herein as a field-effect transistor (FET), it will be understood that a switching transistor may be implemented with other types of transistors, such as bipolar junction transistors (BJTs) (e.g., heterojunction bipolar transistors (HBTs)). Similarly, the use of particular terms, such as "gate", "drain", or "source" should not be taken to imply a particular transistor type, and should be considered interchangeable with other terms (such as "base", "collector", or "emitter") typically used to refer to other types of transistor.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A voltage converter comprising:
a high-side switch circuit block including a plurality of high-side switching elements;
a low-side switch circuit block including a plurality of low-side switching elements;
an intermediate node coupled to one or more high-side switching elements and coupled to one or more low-side switching elements; and
a segmentation circuit block communicatively coupled to the high-side switch circuit block and communicatively coupled to the low-side switch circuit block, the segmentation circuit block configured to receive a control signal indicative of an output state of the voltage converter and selectively drive one or more of the high-side switching elements and one or more of the low-side switching elements based on the control signal.

2. The voltage converter of claim 1 wherein each of the plurality of high-side switching elements of the high-side switch circuit block is a transistor.

3. The voltage converter of claim 2 wherein the segmentation circuit block is communicatively coupled to a respective gate of each respective transistor of the high-side switch circuit block.

4. The voltage converter of claim 1 wherein each of the plurality of low-side switching elements of the low-side switch circuit block is a transistor.

5. The voltage converter of claim 4 wherein the segmentation circuit block is communicatively coupled to a respective gate of each respective transistor of the low-side switch circuit block.

6. The voltage converter of claim 1 further comprising:
a current sense circuit block coupled to the intermediate node; and
a pulse-width modulation source configured to generate a pulse-width modulated signal coupled to the current sense circuit block and coupled to an error correction circuit.

7. The voltage converter of claim 6 wherein the pulse-width modulation source is coupled to the high-side switch circuit block and coupled to the low-side switch circuit block.

8. The voltage converter of claim 6 wherein the pulse-width modulation source is coupled to the segmentation circuit block.

9. The voltage converter of claim 1 wherein the segmentation circuit block includes a low-side segmentation block configured to drive the one or more of the low-side switching elements and a high-side segmentation block configured to drive the one or more of the high-side switching elements.

10. The voltage converter of claim 9 further comprising:
a plurality of high-side switch drivers, each respective high-side switch driver coupled to a respective gate of a respective high-side switching element; and
a plurality of low-side switch drivers, each respective low-side switch driver coupled to a respective gate of a respective low-side switching element.

11. The voltage converter of claim 10 wherein each high-side switch driver is coupled to the high-side segmentation block and each low-side switch driver is coupled to the low-side segmentation block.

12. The voltage converter of claim 11 wherein each high-side switch driver is coupled to the high-side segmentation block and a pulse-width modulation source, and each low-side switch driver is coupled to the low-side segmentation block and the pulse-width modulation source.

13. The voltage converter of claim 1 wherein the high-side switch circuit block includes a first number of high-side switching elements, and the low-side switch circuit block includes a second, distinct number of low-side switching elements.

14. The voltage converter of claim 1 wherein each of the high-side switching elements is arranged in parallel between an output voltage node and the intermediate node, and each of the low-side switching elements is arranged in parallel between the intermediate node and a ground potential.

15. The voltage converter of claim 1 wherein each of the high-side switching elements has a first current-handling capacity, and each of the low-side switching elements has a second current-handling capacity.

16. The voltage converter of claim 1 wherein each of the high-side switching elements has a respective current-handling capacity distinct from the current-handling capacity of another high-side switching element, and each of the low-side switching elements has a respective current-handling capacity distinct from the current-handling capacity of another low-side switching element.

* * * * *